United States Patent [19]
Pflieger et al.

[11] Patent Number: 6,024,771
[45] Date of Patent: Feb. 15, 2000

[54] MIXTURES OF 2:1 ALUMINIUM COMPLEXES

[75] Inventors: Dominique Pflieger, Tagsdorf, France; Bansi Lal Kaul, Biel-Benken, Switzerland

[73] Assignee: Clariant Finance (BVI) Limited, Tortola, Virgin Islands (Br.)

[21] Appl. No.: 09/180,755

[22] PCT Filed: May 14, 1997

[86] PCT No.: PCT/IB97/00546

§ 371 Date: Nov. 13, 1998

§ 102(e) Date: Nov. 13, 1998

[87] PCT Pub. No.: WO97/43344

PCT Pub. Date: Nov. 20, 1997

[30]     Foreign Application Priority Data

May 14, 1996 [GB] United Kingdom .................... 9610001
Aug. 6, 1996 [GB] United Kingdom .................... 9616554

[51] Int. Cl.[7] ............................. C09B 45/00; C09B 67/00
[52] U.S. Cl. ............................. 8/639; 8/638; 8/685; 8/686
[58] Field of Search ................................ 8/638, 685, 686, 8/639

[56]         References Cited

FOREIGN PATENT DOCUMENTS 2 259 305   10/1993   United Kingdom .

*Primary Examiner*—Margaret Einsmann
*Attorney, Agent, or Firm*—Scott E. Hanf

[57]         ABSTRACT

Mixtures of 2:1 Aluminium complexes of the type (Ic) are useful as solvent dyes.

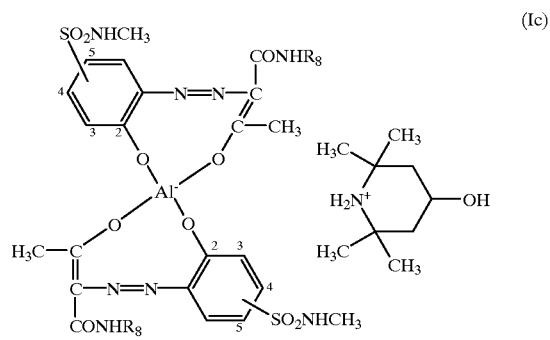

4 Claims, No Drawings

MIXTURES OF 2:1 ALUMINIUM COMPLEXES

This invention relates to mixtures of 2:1 aluminium complexes, a method for producing the same and their use as dyestuffs.

The invention provides in one of its aspects mixtures of aluminium salts having the formula

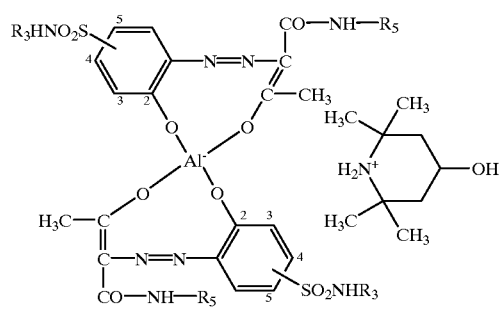

(Ia)

wherein $R_3$ is methoxypropyl and $R_5$ is 2,5-dimethoxy phenyl or 2-methoxy phenyl and the sulphonamide groups are in the 5-position; or

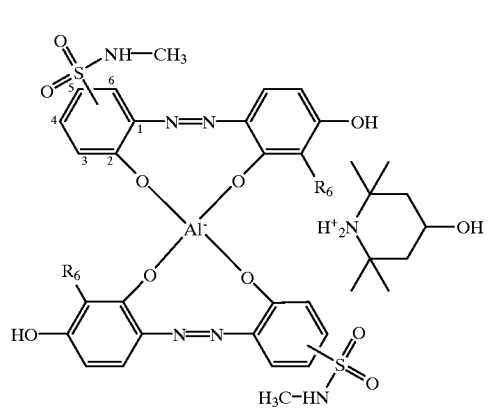

(Ib)

wherein $R_6$ is a residue according to the formula

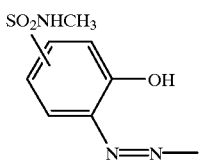

or hydrogen wherein the methylsulphonamido group is in the 4-position; or

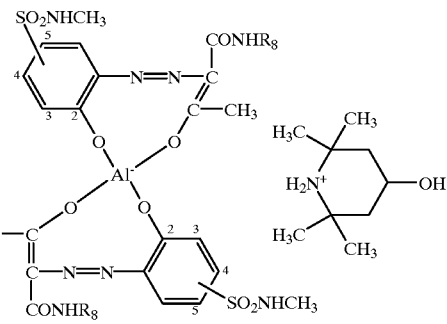

(Ic)

wherein $R_8$ is 2-methoxyphenyl or a group —(CH$_2$)—CH(R$_9$)—(CH$_2$)$_3$CH$_3$ wherein $R_9$ is an ethyl group and the methylsulphonamido group is in the 5-position.

The mixtures of aluminium salts according to the invention are obtained as a statistical mixture of asymmetric and symmetric 1:2 aluminium complexes. It is a characteristic of this invention that the reaction products formed are not separated into their component parts.

It is to be understood that the mixtures according to the invention are mixtures of compounds having the formula (Ia), (Ib) or (Ic); it is not intended that mixtures includes admixture of aluminium salts (Ia) and (Ib), or (Ib) with (Ic) or (Ia) with (Ic).

The mixtures of aluminium salts may be formed by the metallisation of the following azoic ligands.

a)

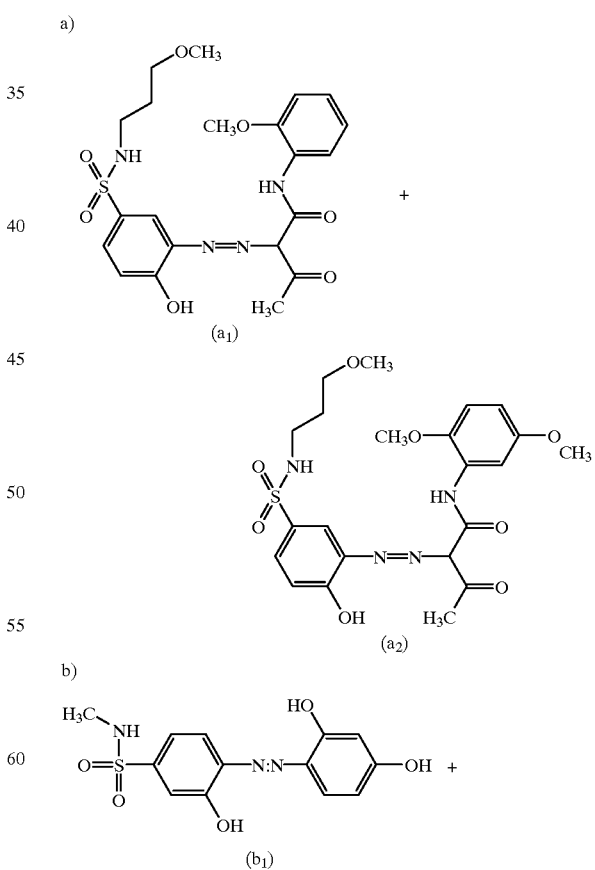

b)

-continued

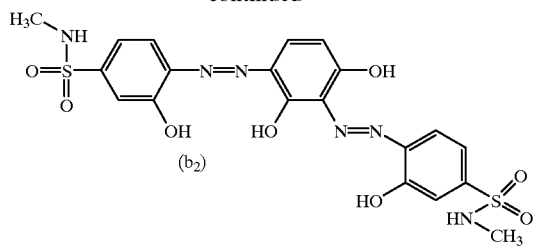
(b₂)

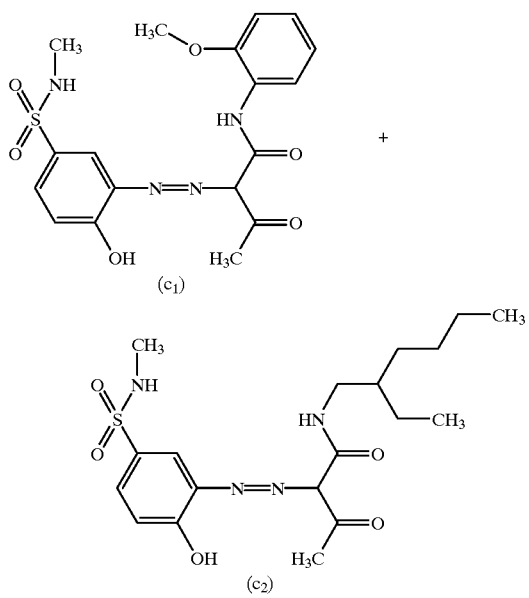

The azoic ligands are preferably formed in-situ and are formed by a coupling reaction of a diazonium salt and a suitable coupling component according to conventional syntheses. As precursors to the diazonium salts one can mention 2-amino-4-(3'-methoxypropylamino-sulphonyl) phenol or 2-amino-4-(3'-methylamino-sulphonyl) phenol and as coupling components, appropriate 1,3 diketones and resorcinol.

The reactions are preferably carried out in a finely divided aqueous suspension or in solution with organic solvents, for example alcohols, ketones or acid amides, e.g. DMF or formamide or their mixtures with water. The reaction may be carried out at ambient temperature, although the temperature is preferably from 40 to 70° C., more preferably 60 to 70° C. Reaction is effected under alkaline conditions, preferably at a pH of 9 to 9.5. The pH can be controlled over the course of the reaction with the use of buffers or neutralizing substances.

Metallisation is effected using an aluminium donating substance, preferably aluminium sulphate under conventional conditions.

Under preferred reaction conditions, the azoic ligands ($a_1$) and ($a_2$) react in 1:1 admixture; ($b_1$) and ($b_2$) react in 8:2 admixture; and ($c_1$) and ($c_2$) react in 1:1 admixture.

The reaction products are insoluble in water but are readily soluble in organic solvents, for example, alcohols which makes them eminently suitable for dyeing (especially for dyeing in the mass) of plastics material including solvent-free and solvent containing plastics masses and solvent-free or solvent containing plastic resins. For example, in finishes based on oil or water based paints, wood stains, in various lacquers, in spin dyeing of viscose of cellulose acetate, for dyeing of natural or synthetic polyamides, polyester, polyethylene, polystyrene, polyvinylchloride, rubber and synthetic leather. The reaction products can be used for printing of graphic material, for dyeing of paper masses, for coating of textile and leather or for printing uses.

In particular, the reaction products can be used in an ecologically beneficial way to print, for example, aluminium foils used for packaging. This enables the aluminium to be recycled easily, reducing waste that results from recycling and reducing the amount of harmful products.

Dyeings with the reaction products have good properties generally, for example, good heat stability properties, good light and weathering properties, good chemical resistance, good migration properties, low blooming, good overcoating properties, good fastness in solvent properties, good dyeing strength and good application properties, e.g., flocculation fastness.

Dyeing, printing and padding can be carried out with the reaction products on substrates by known methods.

There now follows a series of examples which serve to illustrate the invention. In the examples all parts are expressed by weight and temperatures are in degrees Celsius unless otherwise indicated.

EXAMPLE 1 a) 26.0 parts of 2-amino-4-(3'-methoxypropylamino-sulphonyl) phenol are stirred into a mixture of 200 parts of water and 70 parts of 30% HCl. After the addition of 50 parts of ice, the amine is diazotized by the addition of 26.2 parts by volume of 4N $NaNO_2$ solution. After stirring at 0° C. for 3 hours, the resulting diazonium salt solution is slowly added to a mixture of 12.5 parts of 2,5-dimethoxyacetanilide, 10.3 parts of 2-methoxyacetoacetylanilide, 9 parts of 30% NaOH solution, 150 parts of water, 9 parts of glacial acetic acid and 100 parts of ice. The pH is held at 4.5 by the addition of 35 parts of 30% NaOH.

The resulting mixture is then stirred at room temperature for 8 hours and brought to pH 1.5 by the addition of 30% HCl. The resulting precipitate is filtered, washed with 4000 parts of water and dried.

b) 50 parts of the monoazo dyestuff of part a) above are suspended in a mixture of 500 parts of water, 16.1 parts of sodium carbonate and 30 parts of dipropylene glycol monomethyl ether.

This solution is warmed to 96° C. and stirred for 1 hour. The pH value of the suspension is 9.6. After further warming to 90° C., over 1 hours a solution of 10.2 parts of aluminium sulphate (water free) in 40 parts of water is added, whereby a voluminous suspension of the aluminium complex results and the pH value falls to 9.1. The temperature is allowed to fall to 45° C. over 2 hours (with rigorous stirring) and the suspension is slowly reacted with a solution of 8.0 parts of triacetone amine alcohol in 60 parts of water and 6.0 parts of 30% HCl. The resulting precipitate is brought to pH 5.4 by the addition of in excess of 2.4 parts of HCl. The mixture is stirred a further hour at room temperature, filtered and the residue is washed salt-free and then dried. A compound of formula Ia is obtained as a mixture or symmetrical and asymmetrical isomers yielding improved ethanol solubilities (up to 500 g per liter). The dyestuff colors nitrocellulose lacquers a greenish yellow tone.

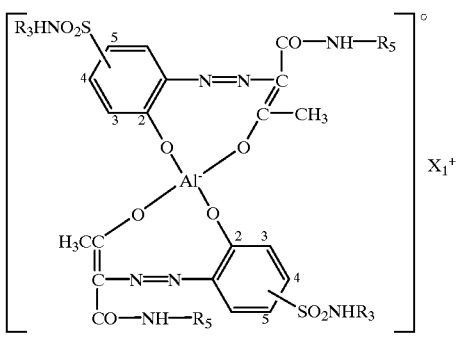

in which $R_3$ is methoxypropyl
$R_5$ is 2,5-dimethoxy phenyl (and 2-monomethoxy phenyl) and the sulphonamide groups are in the 5-position and $X^+$ is the counter ion defined in Example 2.

EXAMPLE 2 a) 40.4 parts of 2-amino-5-(methylaminosulphonyl) phenol are stirred into a mixture of 200 parts of water and 70 parts of 30% HCl. After the addition of 50 parts of ice, the amine is diazotized by the addition of 53 parts by volume of 4N $NaNO_2$ solution. The resulting suspension is stirred for 3 hours at 0° C. A solution of 22.5 parts of resorcinol in 40 parts of water and 10.6 parts of sodium carbonate is then added slowly. The resulting mixture is then stirred at room temperature for 8 hours and brought to pH 1.5 by the addition of 30% HCl. The resulting precipitate is filtered, washed with 4000 parts of water and dried.

Finally the resulting monoazo dyestuff, analogously to the process of Example 1 is reacted with sodium carbonate aluminium sulphate and triacetonamine alcohol to form a 2:1 aluminium complex dyestuff of formula IIa, as a mixture of symmetrical and asymmetrical isomers,

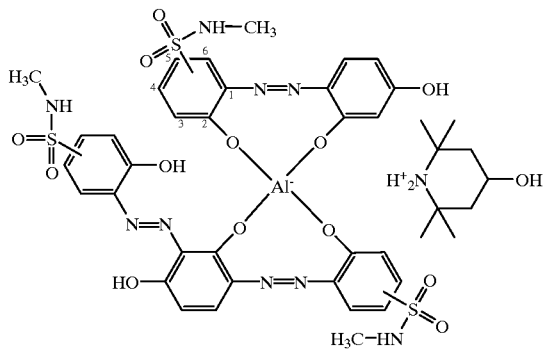

where the sulfonamide group is in the 4-position.

This dyestuff colors nitrocellulose lacquers to a red shade and yields high solubilities in ethanol (up to 500 g per liter).

We claim:

1. A mixture of aluminium salts having the formula (Ia)

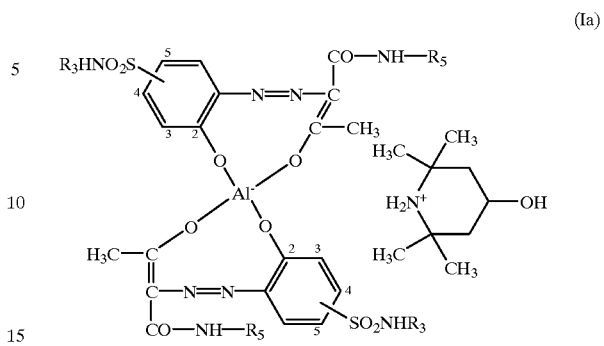

wherein $R_3$ is methoxypropyl and both $R_6$ symbols are 2,5-dimethoxy phenyl or 2-methoxy phenyl and one $R_5$ symbol is 2,5-dimethoxy phenyl and the other is 2-methoxy phenyl and the sulphonamide groups are in the 5-position; or a mixture of aluminum salts having the formula:

(Ib)

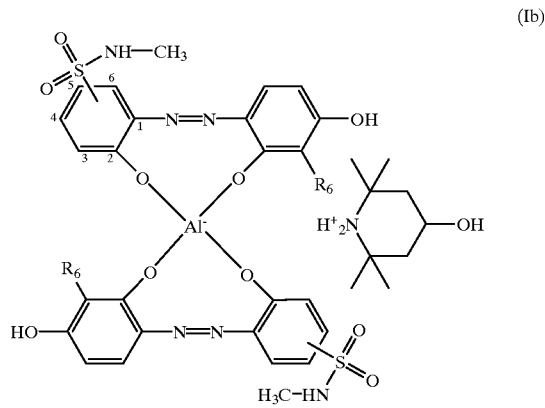

wherein both $R_6$ symbols are a residue according to the formula

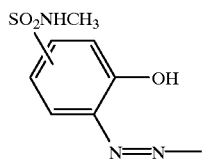

or hydrogen and where one $R_6$ symbol is said structure and the other is hydrogen wherein the methylsulphonamido group is in the 4-position; or a mixture of aluminum salts having the formula:

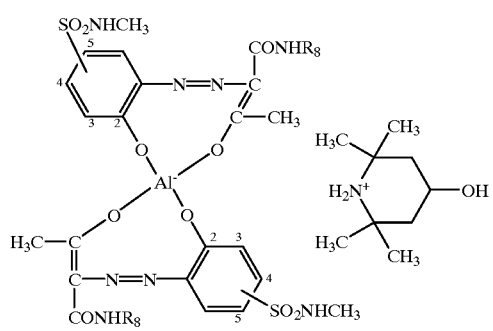
(Ic)

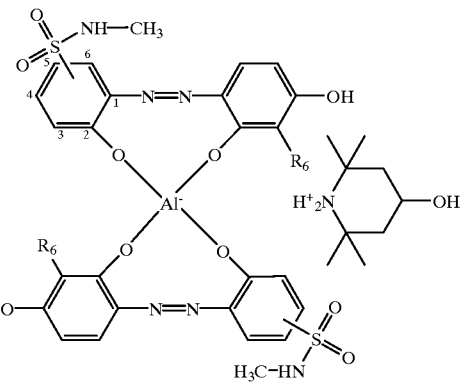
(Ib)

wherein both $R_8$ symbols are 2-methoxyphenyl or a group —$(CH_2)$—$CH(R_9)$—$(CH_2)_3CH_3$ and one $R_8$ symbol is 2-methoxyphenyl and the other is a group —$(CH_2)$—$CH(R_9)$—$(CH_2)_3CH_3$ wherein $R_9$ is an ethyl group and the methylsulphonamido group is in the 5-position.

2. A mixtures of aluminum salt complexes having the formula

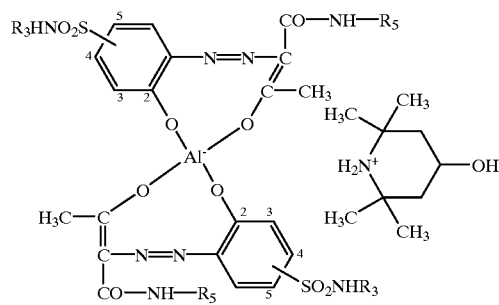
(Ia)

wherein $R_3$ is methoxypropyl and both $R_5$ symbols are 2,5-dimethoxy phenyl or 2-methoxy phenyl and one $R_5$ symbol is 2,5-dimethoxy phenyl and the other is 2-methoxy phenyl and the sulphonamide groups are in the 5-position.

3. A mixture of aluminum salts having the formula:

wherein both $R_6$ symbols are a residue according to the formula

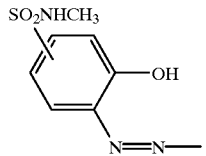

or hydrogen and where one $R_6$ symbol is said structure and the other is hydrogen and the methylsulphonamido group is in the 4-position.

4. A mixture of aluminum salt complexes having the formula:

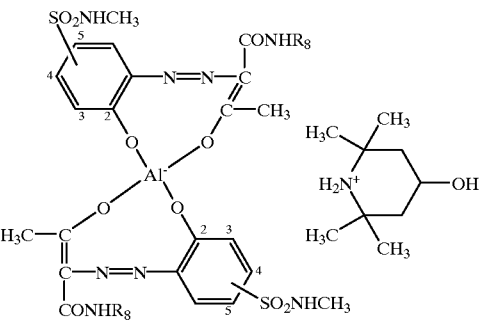
(Ic)

wherein both $R_8$ symbols are 2-methoxyphenyl or a group —$(CH_2)$—$CH(R_9)$—$(CH_2)_3CH_3$ and one $R_8$ symbol is 2-methoxyphenyl and the other is a group —$(CH—)$—$CH(R_9)$—$(CH_2)_3CH_3$ wherein $R_9$ is an ethyl group and the methylsulphonamido group is in the 5-position.

* * * * *